(12) United States Patent
Hainsworth

(10) Patent No.: US 6,585,057 B1
(45) Date of Patent: Jul. 1, 2003

(54) HYDRAULIC TWIN HITCH

(76) Inventor: Charles D. Hainsworth, 6029 Logan Rd., Mt. Morris, NY (US) 14510

( * ) Notice: Subject to any disclaimer, the term of this patent is extended or adjusted under 35 U.S.C. 154(b) by 0 days.

(21) Appl. No.: 10/084,218

(22) Filed: Feb. 28, 2002

Related U.S. Application Data

(60) Provisional application No. 60/281,421, filed on Apr. 5, 2001.

(51) Int. Cl.[7] ................................................ A01C 5/06
(52) U.S. Cl. .......................................... 172/677; 56/346
(58) Field of Search ................ 280/656, 413, 280/414, 412, 411.1, 462, 463, 467, 468, 472; 172/311, 677, 678, 679, 680, 126, 138; 56/14.7, 218–346

(56) References Cited

U.S. PATENT DOCUMENTS

| | | | | |
|---|---|---|---|---|
| 2,695,180 A | | 11/1954 | Weiss .......................... | 280/413 |
| 3,818,955 A | * | 6/1974 | Kline ........................... | 141/12 |
| 4,415,174 A | | 11/1983 | Koehn ......................... | 280/411 |
| 4,627,338 A | * | 12/1986 | Sprott et al. ................. | 99/534 |
| 4,673,579 A | * | 6/1987 | Fenn ............................ | 426/321 |
| 5,024,456 A | | 6/1991 | Hadley et al. .............. | 280/412 |
| 5,579,849 A | | 12/1996 | Houck ......................... | 172/456 |
| 6,126,985 A | * | 10/2000 | Cox ............................. | 426/636 |

* cited by examiner

Primary Examiner—Robert E. Pezzuto
(74) Attorney, Agent, or Firm—Patent & Trademark Services; Thomas Zack; Joseph H. McGlynn

(57) ABSTRACT

A dual tractor hitch used to pull twin hay balers which have an acid tank for treating baled material.

7 Claims, 4 Drawing Sheets

HYDRAULIC TWIN HITCH

This invention claims the benefit of the U. S. Provisional application 60/281,421, filed Apr. 5, 2001.

BACKGROUND OF THE INVENTION

The present invention relates to a hydraulic driven dual tractor hitch for pulling twin hay balers and which has an acid tank used for treating baled hay.

DESCRIPTION OF THE PRIOR ART

Hitches for balers, trailers and the like are known in the prior art. For example, U.S. Pat. No. 2,695,180 to Weiss discloses a hitch arrangement for balers that is automatic side discharge type balers.

U.S. Pat. No. 4,415,174 to Koehn discloses a towing apparatus used to tow vehicles for road travel or place the towed vehicles in a nonaligned position.

U.S. Pat. No. 5,024,456 to Hadley et al. discloses a towing apparatus used to tow vehicles in an aligned position or a side-by-side position.

U.S. Pat. No. 5,579,849 to Houck discloses a towable implement that is convertible between a laterally expanded use position and a laterally narrow transport position.

In the present invention a hydraulic driven dual tractor hitch is used to pull twin hay balers and has an acid tank for treating the baled material, all as will be detailed in the specification that follows hereafter.

SUMMARY OF THE INVENTION

This invention relates to a dual tractor hitch which is used to pull twin hay balers and which has an acid tank for treating the baled material.

It is the primary object of the present invention to provide for an improved tractor hitch which is connectable to multiple material balers to enable simultaneous baling.

Another object is to provide for such a hitch where there is an acid distributing applicator and two balers that may be aligned with one in front of the other behind the towing vehicle.

These and other objects and advantages of the present invention will become apparent to readers from a consideration of the ensuing description and the accompanying drawings.

DESCRIPTION OF THE PREFERRED EMBODIMENT

Figure 1:
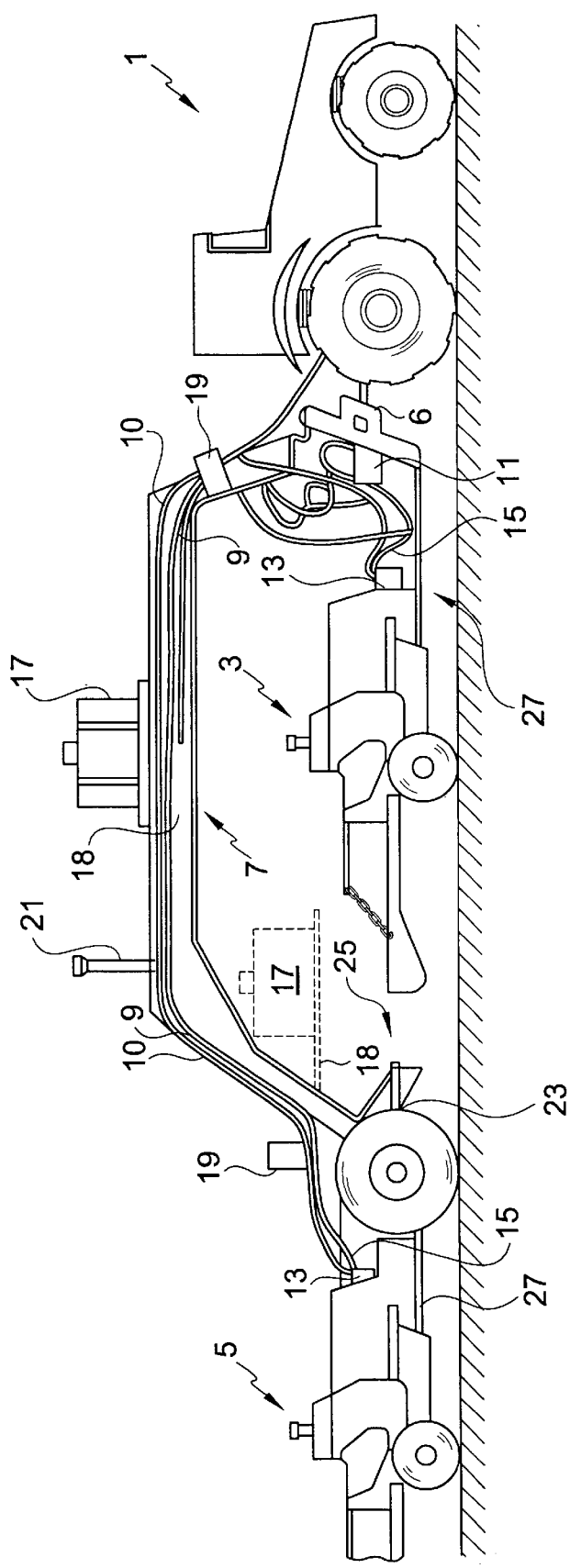
FIG. 1 is a schematic side view of the present invention.

FIG. 1 is a schematic side view of the present invention. A conventional self powered tractor 1 which is used to pull the two substantially identical trailing balers 3 and 5 (partially shown). A supporting steel structure 7, with a spanning beam, acts as a bridging frame to interconnect the tractor 1 to the balers 3 and 5. The structure 7 may be hollow to retain fluid, like oil, which can be pumped in or out of the frame by a hose connection. A three point hitch 6 is used to connect tractor 1 to the frame structure 7. Hydraulically lines 9 also interconnect the conventional main hydraulic pump 11 to conventional hydraulically operated motors 13 used to operate the two balers. Some of the lines 9 are connected to the hollow interior of the oil filled structure 7 via connections such as at point 10. Side swivel connectors one for each baler, interconnect the hydraulic supply lines to the hydraulic motor for each baler.

On the opposite side of the main structure 7 there is a pressurized hose (not shown) coming from the bottom of the main hydraulic pump 11 that is connected to the front of the structure 7 and continues along the length of the beam. At about ¾ of the way down the length of the beam of structure 7, this hose drops down to connect with the rear hydraulic motor 13 on the second baler 5.

Supported on the top surface of the structure 7 is a tank 17 forming part of an acid applicator used to apply acid to the formed bales of material, like hay. This acid is supplied to the hay from each baler by connecting lines 10. These separate acid supply lines may extend side by side with the hydraulic lines 9 for the balers 3,5 and are represented by the numbers 10. The acid supply lines 10 could also run within the hollow frame structure 7.

In another version of the present invention, the same tank 17 sits on top of a steel bracket 18 mounted off the back lower beam, both of which are shown in dotted line format. Conventional oil filters 19 are also placed in the hydraulic lines to filter the oil being conveyed to the hydraulic baler motors. Also shown is vent pipe 21 mounted to the upper part of the frame structure 7, the steerable rear axle 23 and the rear bale bumper 25 (see FIG. 4). It is noted that the hydraulic lines 9 extend to the rear baler along the upper surface of the structure 7 to permit not only the operation of the baler motor but also to permit steering of the supporting undercarriage 27 of the rear baler. Undercarriage steering is accomplished by selectively supplying pressurized hydraulic fluid (e.g., oil) to the rear axle 23.

Figure 2:
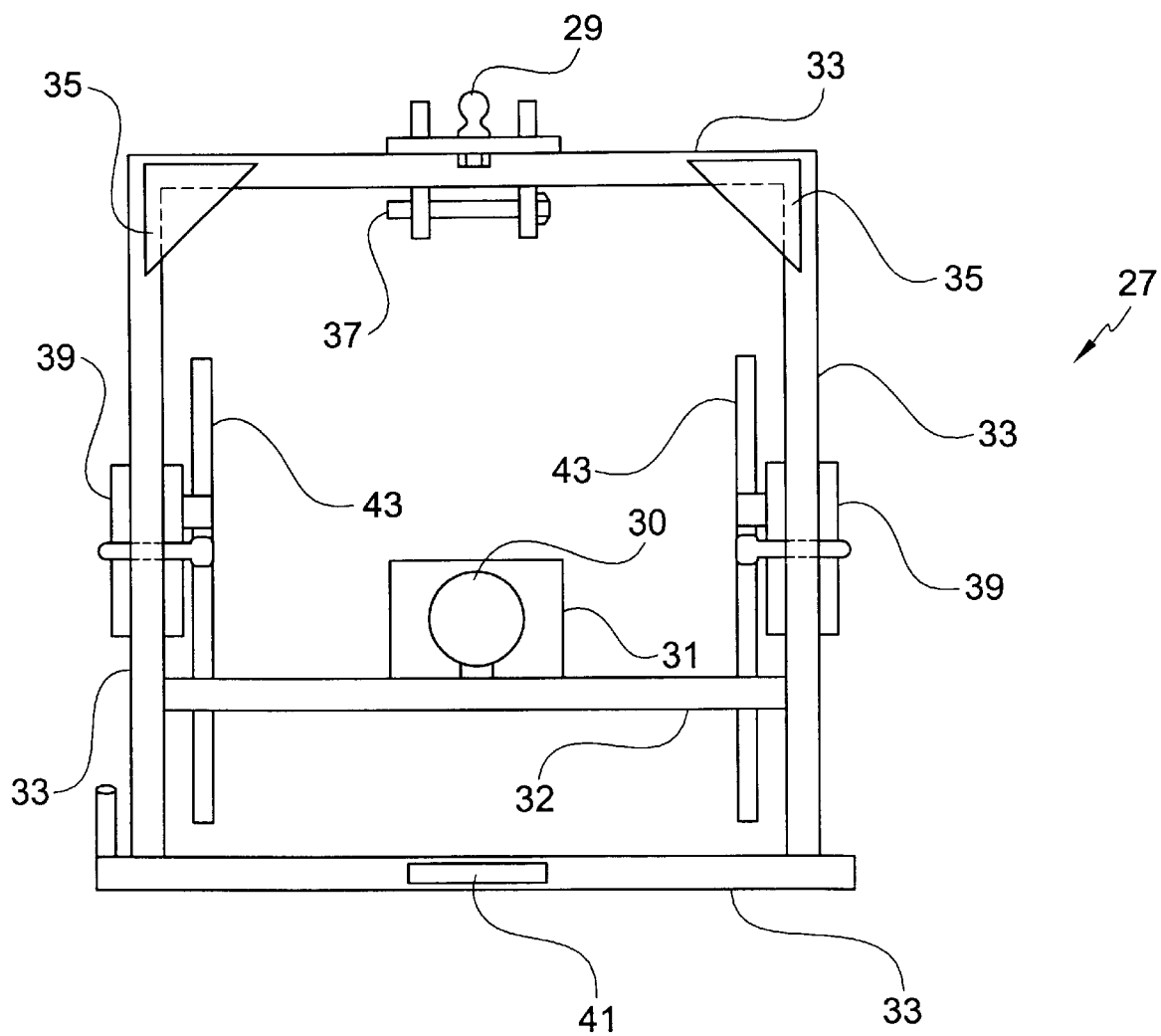
FIG. 2 is a schematic top view of the front portion of the hitch structure used to support the bailers shown in FIG. 1.

FIG. 2 is a top schematic view of the front portion of the underlying hitch frame structure 27 used to support the balers shown in FIG. 1. Substantially identical structures 27 are used for each bailer undercarriage and therefore only one is illustrated. Connecting hoses have been omitted for simplification purposes. The ball hitch 29 mates with the hitch connection on the tractor 1 to permit pulling the structure and all attached components including the two bailers (not shown). The hydraulic pump 30 is mounted on a supporting mounting plate 31 which plate is in turn mounted to a frame support 32 fixed at its ends to a front member (not shown).

The four connected sides 33 form a rigid rectangular shaped frame which has four connected corners. Reinforcing corner steel plates 35 are welded to the corners and are used to increase the rigidity of this frame with sides 33. A pin 37 fixed to the extension members of ball hitch 29 is also shown. Additional reinforcing side plates 39 are also illustrated on two opposite sides of the rectangular framing formed by the sides 33. At the lower side 33 is a hitch plate/pin 41 used to connect the conventional bailer 3 or 5 (not shown) to the undercarriage shown in FIG. 2. Two opposite side jack stands 43 are used, when lowered, to support the undercarriage and the bailers if attached.

Figure 3:
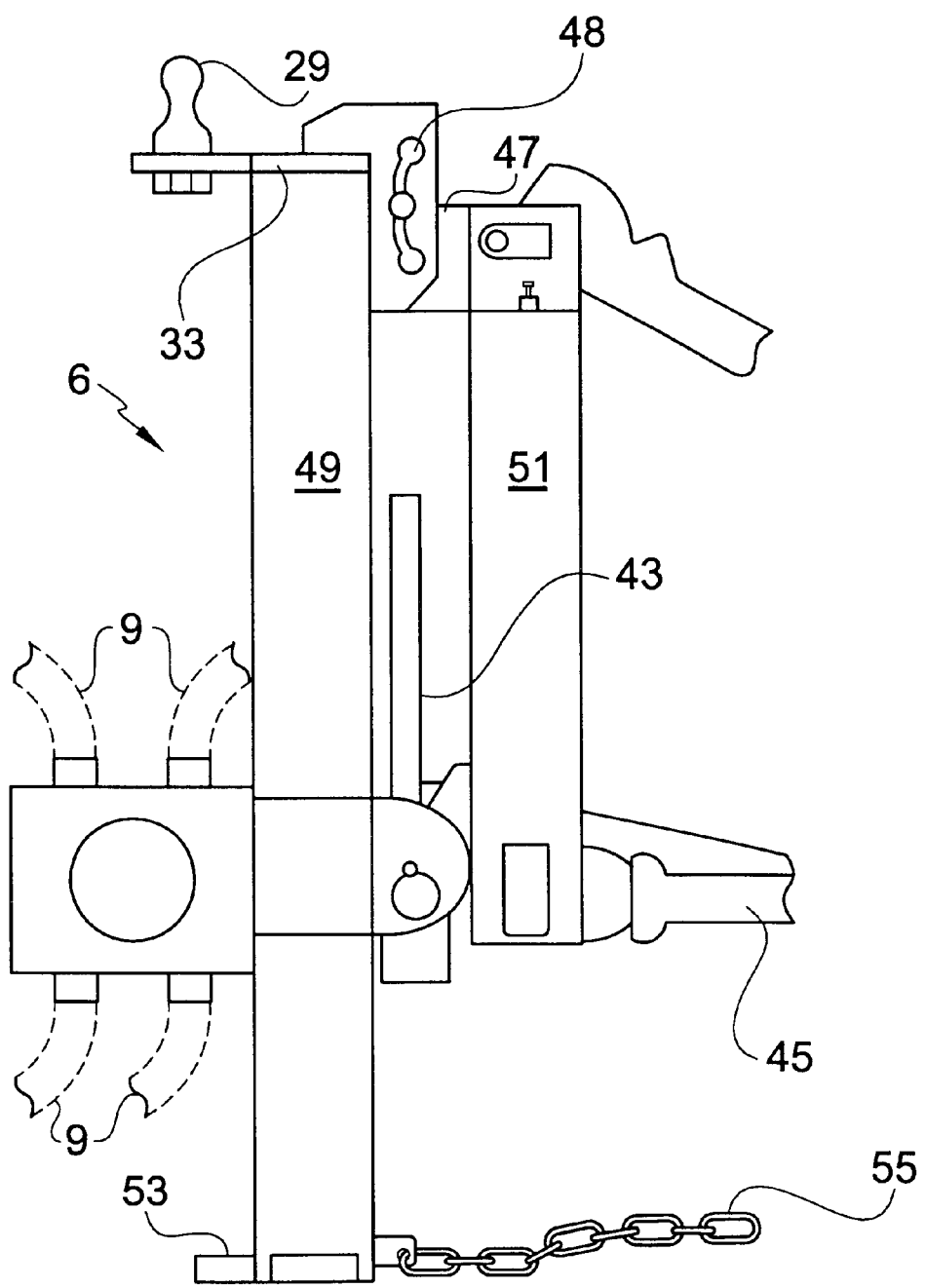
FIG. 3 is an enlarged partial side view of the three point hitch connection shown in FIG. 1 and its associated members.

FIG. 3 is an enlarged partial schematic side view of the three point hitch connection 6 shown in FIG. 1 and its associated members. The purpose of the hitch is to interconnect the undercarriage 27 of the baler 3 to the front tractor 1 (not shown). A power take off (PTO) shaft 45, partially shown, mounts the tractor to the undercarriage and is used as a power source to run the main pump 11 (see FIG. 1). Most of the connecting hydraulic lines are not shown in FIG. 3. These lines carry pressurized oil and would extend from the top and bottom of the main pump 11,as shown in dotted line format. Lines from the main pump 11 supply pressurized fluid to each of the hydraulic pumps 30 on each bailer as shown in FIG. 1.

In FIG. 3, at the upper portion of the hitch, is hook 47 used to mount an extension from the vertical hitch member 49 to the tractor extension assembly, including the standard or conventional "quick hitch" vertical component 51. The hook has a pin rod that may be adjusted to fall into three different spaced notches 48 formed in an opening in the extension to member 49. Between the two vertical components 49 and 51 is the pivotally mounted jack stand 43 in its raised position. A lower front baler hitch point 53 is shown opposite the supply chain 55 that goes to the hitch of the tractor 1.

Figure 4:
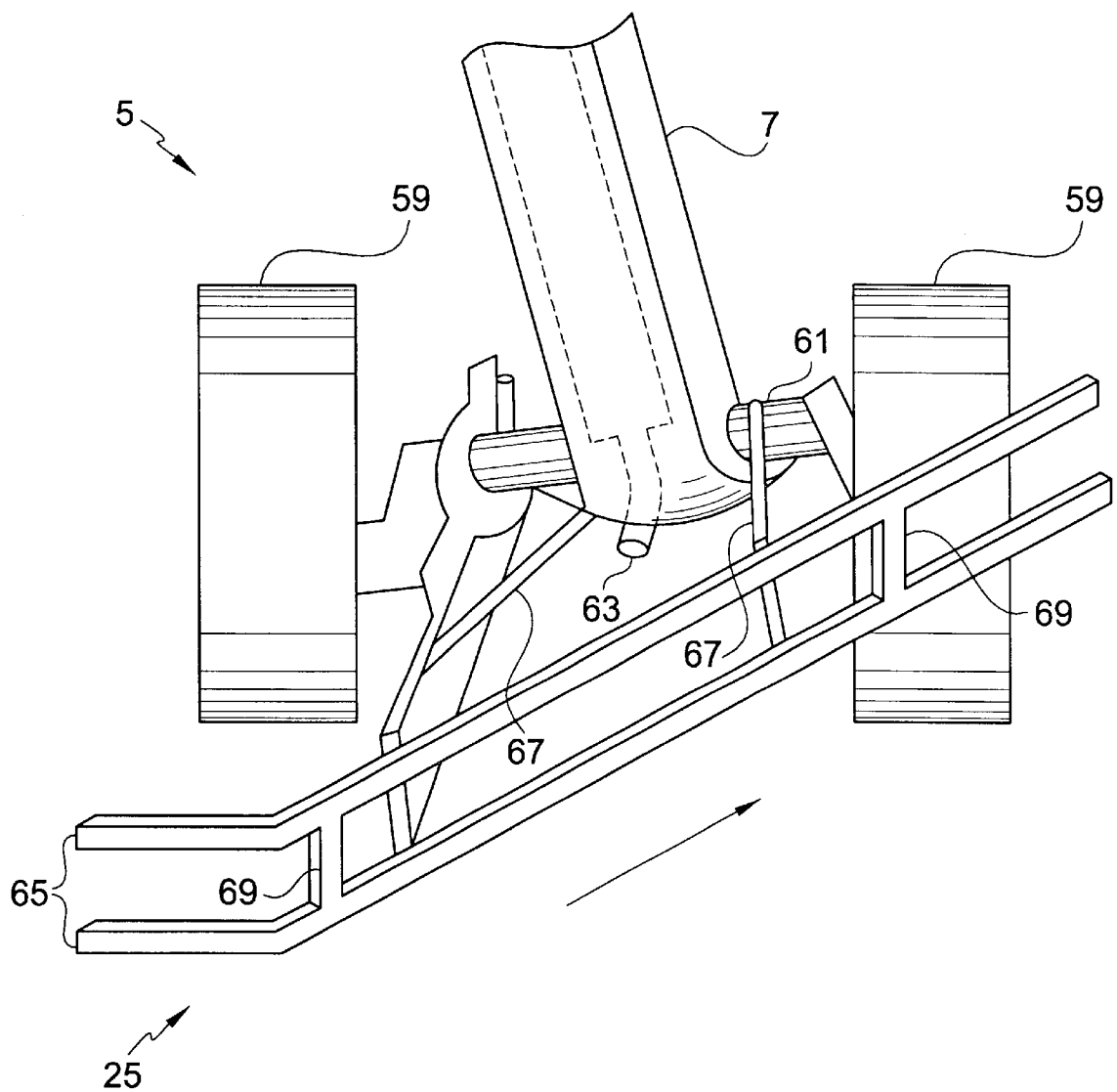
FIG. 4 is a schematic view of part of the rear bale bumper.

FIG. 4 is a schematic view of part of the rear baler bumper 25 for the rear or second baler 5. The two front tires 59 of baler 5 have a connecting hitch axle 61. The oil filled hollow steel frame 7 has dotted lines to indicate the approximate location of the interior cavity, which has a lower closed oil drain plug 63. A hydraulic line or hose (not shown) would be connected to a connection to supply oil or fluid to the hydraulically operated components in the baler, such as motor 13 (see FIG. 1) and a steerable rear axle 23. By using an interior frame 7 oil reservoir input and output lines 9, directed to the hydraulically operated pump, motor and axle 23, may be protected and reduced.

The rear baler bumper 25 is designed to push bails away from the front of the second baler 5 as this baler moves towards the viewer. To do this the spaced parallel bars 65, forming the bumper, are slanted to extend outwardly from the front to the rear. Bumper support frame members 67, fixed to the spaced bars 65 at one end, extend to the undercarriage 27 of the rear hitch to maintain the bumper in place relative to the baler 5. The direction of the arrow indicates the general path a contacted bail would be pushed as the tractor (not shown) moves forward towards the viewer. Additional vertical bumper frame supports 69 maintain the two bumper frame members 65 in a spaced relationship.

In use the two small square hay balers 3 and 5 (see FIG. 1) are connected to the self-contained oil filled hitch structure 7. Each of the hydraulic motors on each baler may be simultaneously operated to bale hay. The operation of the balers is performed by hydraulic motors mounted on each balers, which motors are connected to and in fluid communication with oil supplied from the main pump 11. In turn, pump 11 is driven by the main tractor via shaft 45 (see FIG. 3). Hoses 9 from the main pump are used to feed the hydraulic fluid connected via a 360 degree inlet swivel connectors 15. This type of swivel connector allows for maximum hitch turning freedom. The rear baler 5 is connected to the steerable rear axle 23 which functions to allow the rear baler to be displaced to the left or right of the front or first baler 3 for easy road transit. The hitch structure 7, with the acid applicator tank 17, is used to simultaneously apply acid onto the hay entering both balers. Connected to the rear axle 61 of the rear undercarriage of baler 5 is the rear bale bumper (see FIG. 4) that is used as a pushing bar designed to migrate bales from the first baler 3 out of the way of the second trailing baler 5. The hitch is connected to the tractor 1 by using a standard, or conventional, quick hitch coupler 51 and uses a stabilizer chain 55 to minimize excessive baler movement during the baling operation.

The hitch of FIG. 3 was designed and developed for commercial hay production on a farm. Results of its use have been very successful with a tremendous reduction in hay baling time to a rate of 10 acres an hour which is considerably faster than a known single hay baler operation.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A baling system comprising:
   a first baler connectable to a tractor,
   a second baler connectable to said tractor,
   a supporting structure for interconnecting the first baler and the second baler,
   a hydraulic pumping system having hydraulic lines to supply pressurized fluid to pumps operatively associated with said first baler and with said second baler, and
   acid applicator means mounted on said supporting structure for applying acid to material baled by the first baler and by the second baler.

2. The system as claimed in claim 1, also including a tractor for pulling the first baler and the second baler.

3. The system as claimed in claim 2, wherein said first baler and said second baler are mounted in tandem, with the first baler being adjacent the tractor and the second baler more remote from the tractor,
   said supporting structure being between the tractor and the second baler.

4. The system as claimed in claim 3, wherein said acid applicator means comprises a tank connected by lines to supply acid to the first baler and to the second baler.

5. The system as claimed in claim 4, wherein said supporting structure extends over said first baler with said tank mounted on said supporting structure between the first baler and the second baler.

6. The system as claimed in claim 5, wherein the first baler and the second baler each have an undercarriage with a ball hitch, the ball hitch of the first baler being connected to a hitch on the tractor.

7. The system as claimed in claim 6, wherein the undercarriage of the second baler has a bumper shaped to push baled material from the first baler away from the second baler as the tractor pulls the first and second balers.

* * * * *